(12) United States Patent
Raich et al.

(10) Patent No.: US 11,492,032 B2
(45) Date of Patent: Nov. 8, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Thomas Raich, Vandans (AT); Zhengjie Xue, Shanghai (CN)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/416,586

(22) PCT Filed: Jan. 7, 2020

(86) PCT No.: PCT/EP2020/050202
§ 371 (c)(1),
(2) Date: Jun. 21, 2021

(87) PCT Pub. No.: WO2020/144177
PCT Pub. Date: Jul. 16, 2020

(65) Prior Publication Data
US 2022/0055679 A1      Feb. 24, 2022

(30) Foreign Application Priority Data

Jan. 10, 2019   (DE) ..................... 10 2019 200 250.1

(51) Int. Cl.
*B62D 1/181*     (2006.01)
*B62D 1/189*     (2006.01)

(52) U.S. Cl.
CPC ............. *B62D 1/181* (2013.01); *B62D 1/189* (2013.01)

(58) Field of Classification Search
CPC .................................................... B62D 1/181
See application file for complete search history.

(56) References Cited

U.S. PATENT DOCUMENTS

| 2003/0172765 A1* | 9/2003 | Heiml | B62D 1/184 |
| | | | 280/775 |
| 2005/0161930 A1* | 7/2005 | Schafer | B62D 1/187 |
| | | | 280/775 |

(Continued)

FOREIGN PATENT DOCUMENTS

| DE | 3634977 A1 * | 4/1987 | |
| DE | 19531278 C1 * | 1/1997 | ............. B62D 1/189 |

(Continued)

OTHER PUBLICATIONS

English Translation of International Search Report issued in PCT/EP2020/050202, dated Mar. 27, 2020.

*Primary Examiner* — Nicole T Verley
(74) *Attorney, Agent, or Firm* — thyssenkrupp North America, LLC

(57) ABSTRACT

A steering column for a motor vehicle may comprise a guide box in which a steering spindle is mounted so as to be rotatable about a longitudinal axis and which guide box is adjustably held by a support unit that is able to be connected to the body of the motor vehicle, a pivot bearing in which the guide box in a front region is mounted so as to be pivotable about a pivot axis that lies horizontally so as to be transverse to the longitudinal axis, and an actuation lever that is mounted in a first lever bearing in a rear region of the guide box and in a second lever bearing of the support unit. To increase stiffness and resonance frequency, the pivot bearing may be mounted so as to be displaceable transversely to the pivot axis in a displacement plane parallel to the longitudinal axis.

18 Claims, 3 Drawing Sheets

Section A-A

(56) References Cited

U.S. PATENT DOCUMENTS

| | | | |
|---|---|---|---|
| 2006/0075843 A1* | 4/2006 | Hofschulte | B62D 1/181 74/492 |
| 2008/0087130 A1* | 4/2008 | Beneker | B62D 1/181 74/493 |
| 2009/0064814 A1* | 3/2009 | Tanaka | B62D 1/181 74/493 |
| 2009/0199673 A1 | 8/2009 | Tinnin | |
| 2012/0180594 A1 | 7/2012 | Park | |
| 2018/0086363 A1 | 3/2018 | Stinebring | |
| 2019/0061803 A1 | 2/2019 | Inoue | |
| 2019/0329814 A1 | 10/2019 | Raich | |

FOREIGN PATENT DOCUMENTS

| | | | | |
|---|---|---|---|---|
| DE | 10232041 A1 * | 2/2004 | | B62D 1/184 |
| DE | 10301142 B3 * | 8/2004 | | B62D 1/181 |
| DE | 102007003091 B3 * | 8/2008 | | B62D 1/184 |
| DE | 102008062706 B3 * | 1/2010 | | B62D 1/184 |
| DE | 10 2007 039 361 B | 4/2010 | | |
| DE | 10 2009 038 285 A | 8/2010 | | |
| DE | 102009038285 A1 * | 8/2010 | | B62D 1/181 |
| DE | 102008054310 B4 * | 9/2010 | | B62D 1/181 |
| DE | 102010013522 A1 * | 10/2010 | | B62D 1/183 |
| DE | 102010029129 A1 * | 11/2011 | | B60N 2/16 |
| DE | 10 2012 104 644 B | 8/2013 | | |
| DE | 102009038285 B4 * | 5/2014 | | B62D 1/181 |
| DE | 10 2015 224 602 A | 6/2017 | | |
| DE | 10 2017 200 888 A | 7/2018 | | |
| DE | 102017200888 A1 * | 7/2018 | | B62D 1/181 |
| DE | 102018213679 A1 * | 2/2020 | | B62D 1/181 |
| DE | 102019215670 B3 * | 11/2020 | | |
| EP | 834437 A2 * | 4/1998 | | B62D 1/181 |
| EP | 0939020 B1 * | 2/1999 | | |
| EP | 1382509 A1 * | 1/2004 | | B62D 1/184 |
| EP | 2 088 057 A | 8/2009 | | |
| EP | 3162655 A1 * | 5/2017 | | B62D 1/181 |
| EP | 3601013 B1 * | 5/2021 | | B62D 1/00 |
| FR | 2906781 A1 * | 4/2008 | | B62D 1/181 |
| FR | 2964637 A1 * | 3/2012 | | B62D 1/181 |
| GB | 2304806 A * | 3/1997 | | B62D 1/189 |
| JP | WO2020032130 A1 * | 8/2019 | | |
| WO | WO-2004041619 A1 * | 5/2004 | | B62D 1/181 |
| WO | WO-2004067356 A1 * | 8/2004 | | B62D 1/181 |
| WO | WO-2008086548 A1 * | 7/2008 | | B62D 1/184 |
| WO | WO-2015144527 A1 * | 10/2015 | | B62D 1/181 |
| WO | WO-2018172275 A1 * | 9/2018 | | B62D 1/00 |
| WO | WO-2020032130 A1 * | 2/2020 | | |
| WO | WO-2021191047 A1 * | 9/2021 | | |

\* cited by examiner

Section A-A

STEERING COLUMN FOR A MOTOR VEHICLE

CROSS REFERENCE TO RELATED APPLICATIONS

This application is a U.S. National Stage Entry of International Patent Application Serial Number PCT/EP2020/050202, filed Jan. 7, 2020, which claims priority to German Patent Application No. DE 10 2019 200 250.1, filed Jan. 10, 2019, the entire contents of both of which are incorporated herein by reference.

FIELD

The present disclosure generally relates to steering columns for motor vehicles.

BACKGROUND

In order for the steering wheel position to be adapted to the seated position of the driver of a motor vehicle, adjustable steering columns in various embodiments are known in the prior art. The steering wheel, which is attached to the rear end of the steering spindle, in generic steering columns can be positioned transversely to the direction of the steering spindle longitudinal axis in a vertically upward or downward manner in the vehicle interior by a height adjustment mechanism.

In order to be adjusted for height, the guide box, also referred to as a casing unit or an external casing tube, in the end region thereof which is at the front in the travel direction and in terms of the steering wheel position the lower end region, on a support unit which is able to be attached to the body, is mounted in a pivot bearing so as to be pivotable about a pivot axis, the height adjustment axis, which lies horizontally and thus transversely in relation to the longitudinal axis.

In order to enable the adjustment movement, the guide box in the region thereof which is at the rear in the travel direction, is connected in an articulated manner to the support unit by way of a pivot lever, also referred to as the height adjustment lever. The actuation lever is mounted in a first lever bearing in a rear region of the guide box so as to be horizontally pivotable about a first lever axle which lies so as to be parallel to the pivot axis, and mounted in a second lever bearing on the support unit so as to be horizontally pivotable about a second lever axle which lies so as to be parallel to the first lever axle.

The actuation lever in the lever axles, can preferably be rotated relative to the support unit and to the guide box by means of a motorized adjustment drive, as a result of which the rear region of the guide box, in order to be adjusted for height, can be adjusted in an upward or downward manner relative to the support unit. The adjustment drive comprises, for example, a spindle mechanism which is driven by an electric motor and engages on the actuation lever, as is described in the prior art in DE 10 2007 039 361 B4 or US 2018/0086363 A1, for example.

As a result of the second lever axle being spaced apart from the pivot axis and from the first lever axle, the spacing between the pivot axis and the second lever axle is modified when pivoting for height adjustment. In order for this translatory relocation to be compensated for, it has been proposed in the mentioned prior art to configure a compensation guide between the actuation lever and the guide box, said actuation guide when adjusting permitting a linear compensation movement of the first lever axle, relative to the guide box, in the direction of the longitudinal axis.

The known compensation guide comprises a linear friction guide which enables a translatory compensation movement of the first lever axle relative to the guide box. As a result of the compensation guide, the actuation lever in addition to the rotation about the two lever bearings is imparted a further relative degree of freedom of movement, as a result of which the relative movement can be compensated for. However, as a result of the compensation guide being situated in series between the lever bearings, the stiffness of the connection established by the actuation lever and the resonance frequency can be compromised, this potentially having a disadvantageous effect on the stiffness and the natural frequency of the steering column.

Thus, a need exists for an improved height-adjustable steering column which offers increased stiffness and resonance frequency.

DETAILED DESCRIPTION

Figure 1:
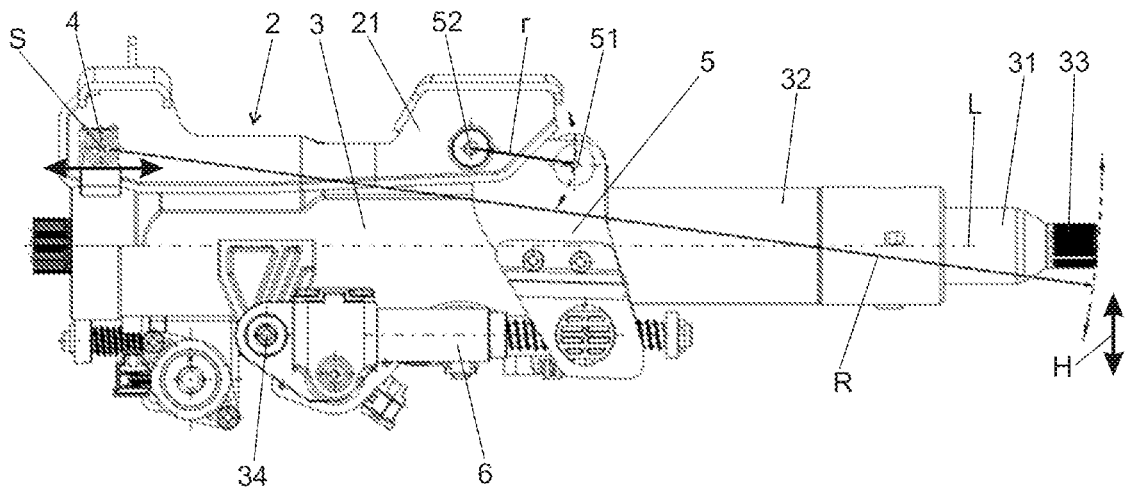
FIG. 1 is a side view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering column for a motor vehicle. In some examples, such a steering column may comprise a guide box in which a steering spindle is mounted so as to be rotatable about a longitudinal axis and which guide box is adjustably held by a support unit that is able to be connected to the body of a motor vehicle, having a pivot bearing in which the guide box in a front region is mounted so as to be pivotable about a pivot axis which lies horizontally so as to be transverse to the longitudinal axis, and an actuation lever which is mounted in a first lever bearing in a rear region of the guide box and in a second lever bearing on the support unit.

In a steering column for a motor vehicle, comprising a guide box in which a steering spindle is mounted so as to be rotatable about a longitudinal axis and which guide box is adjustably held by a support unit that is able to be connected to the body of a motor vehicle, having a pivot bearing in which the guide box in a front region is mounted so as to be pivotable about a pivot axis which lies horizontally so as to be transverse to the longitudinal axis, and an actuation lever which is mounted in a first lever bearing in a rear region of the guide box and in a second lever bearing on the support unit, it is provided according to the invention that the pivot bearing is mounted so as to be displaceable transversely to the pivot axis in a displacement plane parallel to the longitudinal axis.

In the invention, the two lever bearings of the actuation lever can be embodied as pure rotary bearings which by way of tight tolerances and correspondingly minor play in the bearings can be conceived so as to be sufficiently smooth-running. As a result, a high level of stiffness of the articulated connection can be implemented by means of the actuation lever. The potential issues in the prior art can be effectively avoided in the invention by the additional translatory degree of freedom of the actuation lever.

In order to compensate the relative movement which arises when adjusting, the pivot bearing may have an additional degree of freedom, specifically in the direction of a translatory movement parallel to the displacement plane which extends normally, that is to say perpendicularly to the pivot axis so as to be parallel to the longitudinal axis so that a relative compensation movement of the pivoting mounting of the guide box relative to the support unit is enabled.

One advantage of the invention is that the compensation bearing can be incorporated directly on the pivot bearing, between the guide box and the support unit, and a connection is in each case implemented to only one mounting which is in each case simply rotary and translatory, as opposed to the prior art having the translatory mounting and the two rotary mountings on the actuation lever. As a result of the shorter chain of tolerances of the mountings, a smaller overall tolerance and accordingly a higher degree of stiffness can be achieved.

A further advantage is that a large installation space for implementing a combination according to the invention of pivoting and sliding mountings is available in the region of the pivot bearing. As a result of accordingly larger dimensioning, it is in terms of construction possible to more easily meet the requirements pertaining to an ideally high stiffness of the mounting.

Moreover, the pivot bearing and the sliding mounting which is combined with the former according to the invention, are subject to less stress by transverse forces, which during the operation are exerted on the guide box by way of the steering wheel and the steering spindle and are absorbed by the mounting. Specifically, as a result of the stiffness of the mounting of the actuating lever, said stiffness being greater in comparison to the prior art, transverse forces are at least partially absorbed by the lever bearings of the actuation lever and kept away from the pivot bearing. This likewise contributes to a higher degree of stiffness of the steering column.

One advantageous embodiment of the invention provides that the pivot bearing has a bearing element which is guided so as to be displaceable relative to the support unit and/or to the guide box and in which a bearing pin of the pivot bearing is rotatably mounted. The bearing element has the rotary bearing, for example a bearing bore for the bearing pin of the pivot bearing. As a result of the bearing element being mounted in a sliding or linear guide so as to be movable parallel to the displacement plane, a translatory compensation movement can take place during the height adjustment.

In order for the compensation movement to be carried out, the bearing element can be displaceable in a translatory manner relative to the support unit, and in terms of this direction of movement be fixed to the guide box, or else vice versa, that is to say be displaceable in a translatory manner relative to the guide box and fixedly connected to the support unit.

The bearing pin in the bearing element is preferably mounted so as to be rotatable about the pivot axis. The potential rotary and translatory movement of the bearing pin in this instance takes place relative to the support unit, if the bearing element is mounted so as to be displaceable on said support unit, or a relative to the guide box, if the bearing element is mounted so as to be displaceable on said guide box. Alternatively, it is conceivable and possible for the bearing pin in terms of rotation about the pivot axis to be fixed to the bearing element and conjointly with the latter to be displaceable only in a translatory manner, for example relative to the support unit. In this instance, the rotatable mounting can take place relative to the guide box. Conversely, a rotatable mounting relative to the support unit, and a translatory mounting relative to the guide box, may also be implemented.

The bearing element offers the advantage that said bearing element in terms of construction can unify therein functionally separate bearing faces for the rotary pivoting mounting of the bearing pin and the translatory sliding mounting.

One advantageous refinement is that friction faces which slide on one another are configured on the bearing element and on the support unit or the guide box. The friction faces form corresponding bearing faces of a friction guide in which the bearing element can move in a sliding translatory manner so as to carry out the compensation movement relative to the support unit, or about the guide box. Friction guides of this type can be implemented with little complexity and so as to be functionally reliable.

The support unit, also referred to as the console, is preferably configured so as to be U-shaped in the cross section, having two lateral flanges which project vertically downward so as to be parallel to the longitudinal axis and so as to be mutually opposite in relation to the longitudinal axis. Each of the lateral flanges can preferably have one compensation opening and friction faces.

The friction faces can preferably be disposed in a wedge-shaped manner. The friction faces which extend along the displacement direction are inclined toward one another transversely to the displacement direction such that the friction guide is imparted a substantially V-shaped or trapezoidal cross section. It is advantageous here that the friction guide forms a positive guide which is defined in the displacement direction. As a result of the friction faces being mutually stressed in the direction of the wedge, an adjustment of the friction guide without play can take place by way of a minor contact pressure force by virtue of the wedge effect, as a result of which a high degree of stiffness is achieved.

In order for a wedge-shaped friction guide to be implemented, it can be provided that one friction face on the bearing element is configured in the shape of a conical shell so as to be coaxial with the pivot axis, and one corresponding friction face on the support element or the guide box is configured on a longitudinal side of an elongate compensation opening, preferably so as to be arranged in pairs along the longitudinal peripheries of the compensation opening.

The bearing element here has a portion which projects in a conical shape so as to be coaxial with the bearing pin, said portion plunging into the slot-shaped compensation opening which is elongate in the displacement direction. The bearing element by way of the conical shell face thereof contacts the two longitudinal lateral peripheries which are opposite one another in the compensation opening. Friction faces which are in each case inclined toward one another at the cone angle can be disposed along these longitudinal peripheries, the conical bearing element lying against said friction faces. A bearing pin can in each case penetrate coaxially at least one bearing element and one compensation opening. A bearing pin here can have a threaded portion, for example, which can be screwed into a corresponding thread in the guide box so as to brace the conical friction face in the compensation opening. One advantage of the conical friction face is that no adjustment or alignment in the displacement direction relative to the compensation opening is required, and wedging is practically precluded.

A bearing pin which penetrates the bearing element can be fixed in a translatory manner relative to the guide box. As a result, the bearing element can be fixedly established on the guide box by the bearing pin in relation to a translatory displacement, wherein said bearing element in the elongate compensation opening in the support unit, for carrying out the compensation movement, can move in a translatory manner relative to the support unit. The bearing pin can be configured as a screw pin, wherein one bearing pin penetrates in each case one compensation opening of a lateral flange and is fixedly established in a thread on the guide box. In an alternative embodiment it can be provided that a single pin which extends through the two compensation openings of the lateral flanges and one opening of the guide box and the two bearing elements is provided.

One advantageous embodiment of the invention provides that the bearing element has a supporting element which projects transversely to the pivot axis. The supporting element can for example a bracket as a securing element for securing against rotation relative to the support unit such that said supporting element can only move in a translatory manner in the friction guide. The bracket can encompass a lateral flange, for example about a longitudinal edge that runs parallel to the extent of the compensation opening, so that the bearing element is held displaceably on the lateral flange so as to be secured against rotation about the pivot axis. As a result, the bearing element can be secured against falling out of the compensation opening, as a result of which the assembling is simplified. The supporting element can preferably be elastically deformable such that the bearing element with the supporting element can be hooked to the lateral flange and snap-fitted into the compensation opening.

The bearing element can that preferably be configured from plastics material, preferably as an injected-molded plastic part. The friction faces which are configured from plastics material on a conical protrusion, for example, can slide along the friction faces of the guide box, which is usually made of steel, without play and with little friction and wear. The production as an injection-molded plastic part furthermore makes it possible for a spring-elastic supporting element to be integrally configured with the bearing element.

A motorized adjustment drive can engage on the actuation lever. This motorized adjustment drive, as is known per se from the prior art, can comprise a spindle mechanism which can be driven in a motorized manner and which is supported on the guide box or the support unit.

The guide box on the support unit is preferably held between two lateral flanges which project vertically downward so as to be parallel to the adjustment plane, wherein each of the lateral flanges has a pivot bearing. The compensation opening can in each case extend in the direction of the longitudinal axis.

FIG. 1 in a lateral view shows a steering column 1 according to the invention, having a support unit 2, also referred to as a console, which, in the illustration shown by way of the upper side of said support unit 2, is able to be fixedly established on a body, not illustrated, of a motor vehicle, and on which a guide box 3 is adjustably held.

A steering spindle 31 is mounted in the guide box 3 and in a casing tube 32 so as to be rotatable about a longitudinal axis L and, at the end of said steering spindle 31, which in terms of the travel direction is the rear end, has a fastening portion 33 for attaching a steering wheel that is not illustrated. The casing tube 32 is held in the guide box 3 so as to be telescopically adjustable in the direction of the longitudinal axis L, as a result of which a longitudinal adjustment of the steering wheel is enabled.

The support unit 2 is configured so as to be U-shaped in the cross section, having two lateral flanges 21 which are mutually opposite in relation to the longitudinal axis L and between which the guide box 3 is received.

In the front region, the guide box 3 is mounted in a pivot bearing 4 about a pivot axis S on the support unit 2, said pivot axis S being horizontal so as to be perpendicular to the longitudinal axis L and in FIG. 1 is oriented so as to be perpendicular to the drawing plane.

An actuation lever 5 which is mounted on the guide box 3 so as to be pivotable about a first lever axle 51 of a first lever bearing, and on the support unit 2 so as to be pivotable about a second lever axle 52 of a second lever bearing, is disposed in the rear region. The lever axles 51 and 52 lie so as to be parallel to the pivot axis S and have a mutual spacing of the lever length r.

The actuation lever 5 can be pivoted in the lever bearings 51 and 52 by means of an adjustment drive 6 which is configured as a spindle mechanism which can be driven in a motorized manner and which by way of one end thereof engages on a counter bearing 34 on the guide box 3, and by way of the other end thereof engages on the actuation lever 5, as a result of which the fastening portion 33 for adjusting the height can be adjusted vertically in an upward and downward manner in the height direction H. As a result, the guide box 3 is rotated about the pivot axis S, wherein the pivot bearing 4, by virtue of the spacing between the pivot axis S and the second lever axle 52, is moved translatory relative to the support unit 2, as is indicated by the arrows in FIG. 1.

Figure 2:
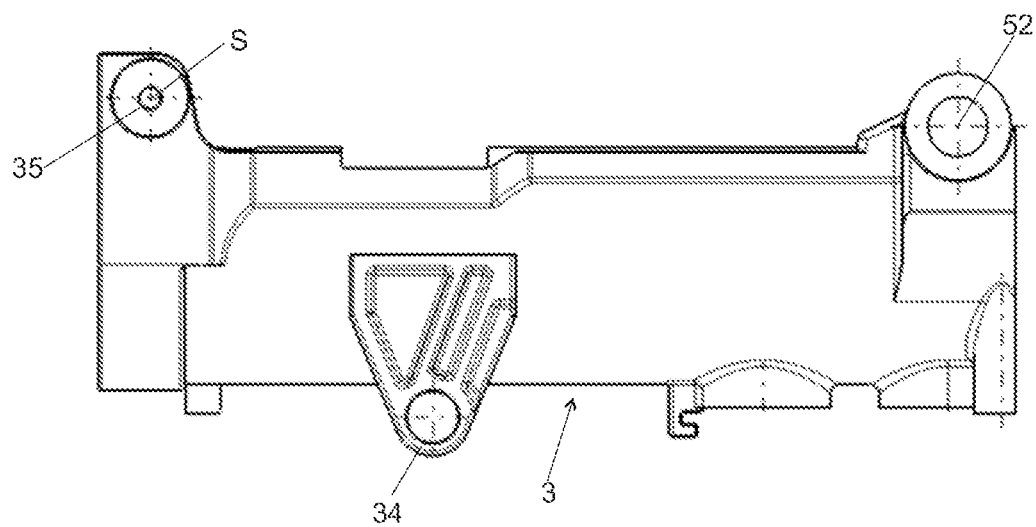
FIG. 2 is a side view of an example guide box of the steering column according to FIG. 1.

The guide box 3 is individually shown in FIG. 2. The disposal of the pivot axis S relative to the second lever axle 52 can be seen here. The guide box 3 has a threaded bore 35 which is coaxial with the pivot axis.

Figure 3:
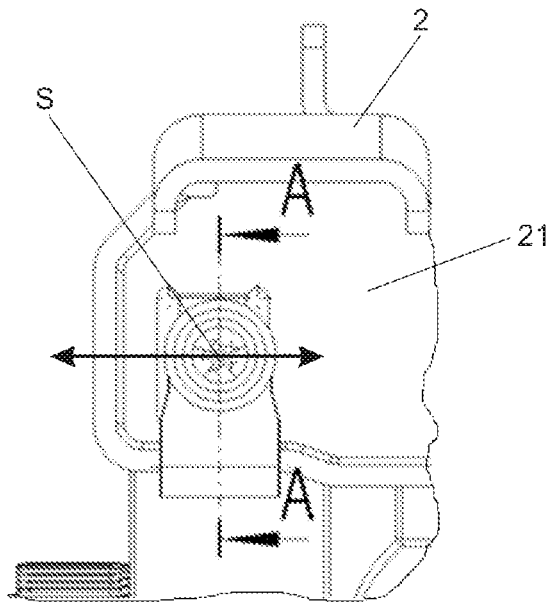
FIG. 3 is an enlarged detail view of FIG. 1 in a region of an example pivot bearing.
Figure 4:
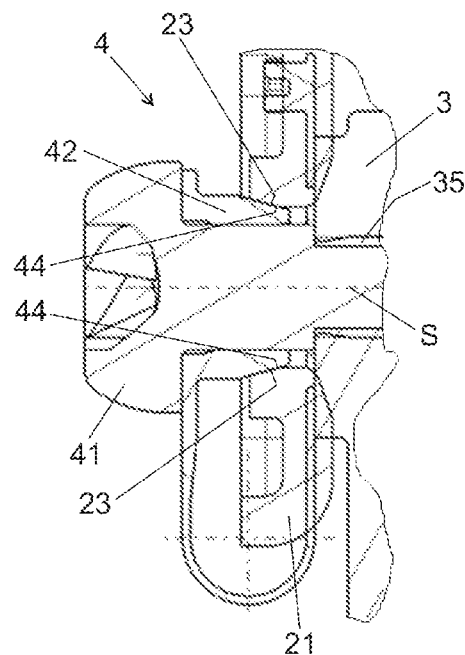
FIG. 4 is a sectional view across line A-A through the pivot bearing according to FIG. 3.
Figure 7:
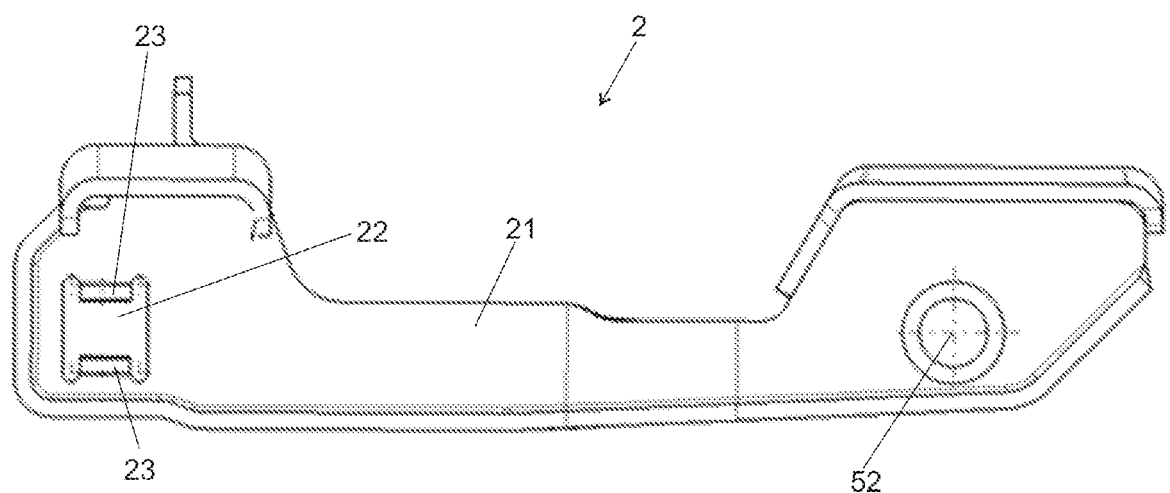
FIG. 7 is a side view of an example support unit of the steering column according to FIGS. 1 to 4.

FIG. 3 shows an enlarged fragment from FIG. 1, and FIG. 4 shows a vertical section A-A through the pivot axis S in a view from the rear. The pivot bearing 4 illustrated here comprises a bearing pin 41 which is disposed so as to be coaxial with the pivot axis S and is screwed into the threaded bore 35 of the guide box 3. The bearing pin 41 penetrates an elongate compensation opening 22 of the support unit 2, said compensation opening 22 being configured in the lateral flange 21. The compensation opening 22 in the predefined displacement direction, for example in the direction of an imaginary connecting line between the pivot axis S and the second lever axle 52, extends longitudinally along the steering column 1, as can be derived from the individual illustration of the support unit 2 in FIG. 7.

The bearing pin 41 in a bearing element 42 according to the invention is rotatably mounted in a bearing bore 43 which is coaxial with the pivot axis S.

Figure 5:
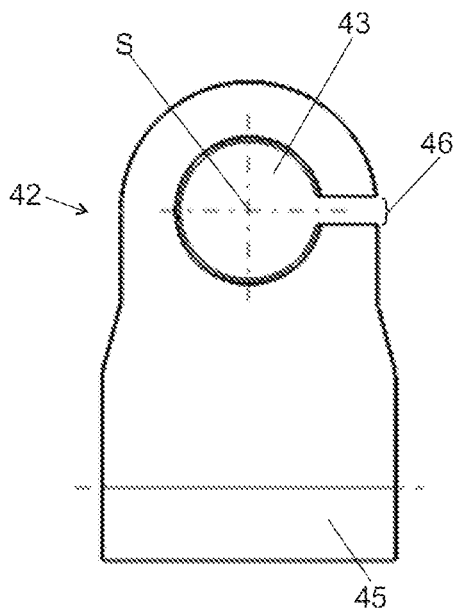
FIG. 5 is a side view of an example bearing element of the steering column according to FIGS. 1 to 4, in a direction of a pivot axis.
Figure 6:
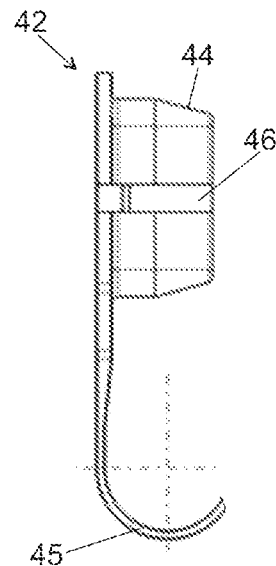
FIG. 6 is a front view, transverse to the pivot axis, of the bearing element according to FIG. 5.

The bearing element 42 has a conical appendage which is coaxial with the bearing bore 43 and has a friction face 44 in the shape of a conical shell, as can be derived from FIGS. 5 and 6 which show the bearing element 42 in a view in the direction of the pivot axis S (FIG. 5) and transversely to the latter (FIG. 6).

The bearing element 42 by way of the conical friction face 44 lies against friction faces 23 on the external side of a lateral flange 21 of the support unit 2, said friction faces 23 being configured in the direction of the longitudinal extent on the peripheries of the compensation opening 22 and being mutually wedge-shaped, as can be seen in FIG. 4. The angle of the wedge between the friction faces 23 here corresponds substantially to the cone angle of the friction face 44. As a result, a friction guide in which the bearing element 42 can move in a translatory manner relative to the support unit 2 is formed in the displacement direction, as is indicated by the arrows in FIG. 3. As a result, a compensation movement for compensating the translatory relative movement of the pivot axis S relative to the second lever axle 52 during the height adjustment is possible.

The bearing element 42 has a bracket-shaped supporting element 45 which projects laterally in terms of the bearing bore 43 and which encompasses the external edge of the lateral flange 21, as can be seen in FIG. 4. The supporting element 45 is elastic so that the bearing element 42 can be snap-fitted and held in the compensation opening 23. In the assembled state, the supporting element 45 in the displacement direction can slide relative to the lateral flange 21, herein securing the bearing element 42 against rotation.

The bearing opening 43 of the bearing element 42 can be open toward the outside by way of a slot 46, as a result of which the friction face 44 in the shape of a conical shell can radially expand and, as a result thereof, be brought to frictionally contact the friction faces 23 in an optimal manner.

The bearing element 42 can preferably be integrally configured as an injection-molded plastic part. Alternatively, the bearing element 42 can also be formed from a metallic material, for example from a non-ferrous metal.

LIST OF REFERENCE SIGNS

1 Steering column
2 Support unit
21 Lateral flange
22 Compensation opening
23 Friction faces
3 Guide box
31 Steering spindle
32 Casing tube
33 Fastening portion
34 Counter bearing
35 Threaded bore
4 Pivot bearing
41 Bearing pin
42 Bearing element
43 Bearing bore
44 Friction face
45 Supporting element
46 Slot
5 Actuation lever
51, 52 Lever axle
6 Adjustment drive
L Longitudinal axis
S Pivot axis
H Height direction

What is claimed is:

1. A steering column for a motor vehicle comprising:
   a guide box in which a steering spindle is rotatably mounted about a longitudinal axis;
   a support unit that adjustably holds the guide box and is connectable to a body of the motor vehicle;
   a pivot bearing in which the guide box in a front region is mounted so as to be pivotable about a pivot axis that lies horizontally so as to be transverse to the longitudinal axis, wherein the pivot bearing is mounted so as to be displaceable transversely to the pivot axis in a displacement plane parallel to the longitudinal axis; and
   an actuation lever that is mounted in a first lever bearing in a rear region of the guide box and in a second lever bearing on the support unit,
   wherein the pivot bearing includes a bearing element that is guided so as to be displaceable relative to at least one of the support unit or the guide box, wherein a bearing pin of the pivot bearing is rotatably mounted in the bearing element.

2. The steering column of claim 1 wherein friction faces that slide on one another are configured on the bearing element and on at least one of the support unit or the guide box.

3. The steering column of claim 2 wherein the friction faces are disposed in a wedge-shaped manner.

4. The steering column of claim 3 wherein a first of the friction faces disposed on the bearing element is configured in a shape of a conical shell so as to be coaxial with the pivot axis, wherein a second of the friction faces disposed on at least one of the support unit or the guide box is configured on a longitudinal side of an elongate compensation opening.

5. The steering column of claim 4 wherein the first and second of the friction faces are arranged as a pair along a longitudinal periphery of the elongate compensation opening.

6. The steering column of claim 1 wherein the bearing element includes a supporting element that projects transversely to the pivot axis.

7. The steering column of claim 1 wherein the bearing element is configured from plastic.

8. The steering column of claim 1 comprising a motorized adjustment drive that engages on the actuation lever.

9. The steering column of claim 1 wherein the guide box on the support unit is held between two lateral flanges that project vertically downward parallel to a displacement plane, wherein each of the two lateral flanges includes a pivot bearing.

10. A steering column for a motor vehicle comprising:
    a guide box in which a steering spindle is rotatably mounted about a longitudinal axis;
    a support unit that adjustably holds the guide box and is connectable to a body of the motor vehicle;
    a pivot bearing in which the guide box in a front region is mounted so as to be pivotable about a pivot axis that lies horizontally so as to be transverse to the longitudinal axis, wherein the pivot bearing is mounted so as to be displaceable transversely to the pivot axis in a displacement plane parallel to the longitudinal axis; and
    an actuation lever that is mounted in a first lever bearing in a rear region of the guide box and in a second lever bearing on the support unit, wherein a bearing pin that penetrates a bearing element of the pivot bearing is fixed so as to be translatory relative to the guide box.

11. The steering column of claim 10 wherein friction faces that slide on one another are configured on the bearing element and on at least one of the support unit or the guide box.

12. The steering column of claim 11 wherein the friction faces are disposed in a wedge-shaped manner.

13. The steering column of claim 12 wherein a first of the friction faces disposed on the bearing element is configured in a shape of a conical shell so as to be coaxial with the pivot axis, wherein a second of the friction faces disposed on at least one of the support unit or the guide box is configured on a longitudinal side of an elongate compensation opening.

14. The steering column of claim 13 wherein the first and second of the friction faces are arranged as a pair along a longitudinal periphery of the elongate compensation opening.

15. The steering column of claim 10 wherein the bearing element includes a supporting element that projects transversely to the pivot axis.

16. The steering column of claim 10 wherein the bearing element is configured from plastic.

17. The steering column of claim 10 comprising a motorized adjustment drive that engages on the actuation lever.

18. The steering column of claim 10 wherein the guide box on the support unit is held between two lateral flanges that project vertically downward parallel to a displacement plane, wherein each of the two lateral flanges includes a pivot bearing.

* * * * *